COLOR TELEVISION RECEIVING APPARATUS

Filed March 16, 1954 4 Sheets-Sheet 1

INVENTOR
Robert P. Benjamin
BY Cushman, Darby & Cushman
ATTORNEYS

COLOR TELEVISION RECEIVING APPARATUS

Filed March 16, 1954 4 Sheets-Sheet 2

INVENTOR
Robert P. Benjamin

BY Cushman, Darby & Cushman
ATTORNEYS

Jan. 12, 1960 R. P. BENJAMIN 2,921,118

COLOR TELEVISION RECEIVING APPARATUS

Filed March 16, 1954 4 Sheets-Sheet 3

INVENTOR

Robert P. Benjamin

BY Cushman, Darby & Cushman

ATTORNEYS

COLOR TELEVISION RECEIVING APPARATUS

Filed March 16, 1954 4 Sheets-Sheet 4

INVENTOR
Robert P. Benjamin

BY Cushman, Darby & Cushman
ATTORNEYS 2,921,118

COLOR TELEVISION RECEIVING APPARATUS

Robert P. Benjamin, Hyattsville, Md., assignor, by mesne assignments, to Joseph E. Butler, Bethesda, Md.

Application March 16, 1954, Serial No. 416,556

20 Claims. (Cl. 178—5.4)

This invention pertains to television receiving methods and equipment and particularly to television receiving circuits and methods for producing color images.

In accordance with the various features of the invention, color images may be produced from "color" signals by use of methods and circuits basically of the type currently designed for monochrome picture rendition from monochrome signals, with certain modifications according to the present invention for permitting the derivation of color. It will be understood that the invention applies equally to conversion of existing receivers, or manufacture of new equipment.

As is now well known to those skilled in the television art, the Federal Communications Commission has by its decision of December 17, 1953 set certain "color" television standards, these being commonly referred to as the National Television System Committee (NTSC) color television transmission standards. These standards being well known to the trade, it is thought unnecessary to repeat them here in detail. Briefly stated, in accordance with these standards three so-called partial color signals are generated at the transmitter, according to red, green and blue primary colors. These signals are mixed so as to provide for transmission a luminance (brightness) component transmitted as amplitude modulation of the picture carrier and a simultaneous pair of chrominance (coloring) components transmitted as the amplitude modulation sidebands of a pair of suppressed subcarriers in quadrature having the common frequency relative to the picture carrier of 3.579545 mc.

The television transmission includes a color reference signal for use in determining color hue of the phase modulated 3.579545 mc. signal. Specifically, in the now approved standards the reference signal appears as a burst of sine wave at 3.579545 mc. per second on the "back porch" of the horizontal blanking pedestals.

Certain receiving equipment is now proposed for reception of these standardized color transmissions, which will produce extremely high quality color rendition. However, these proposed circuits are quite complex and rely upon the use of so-called tri-color tubes or similar complicated and expensive display devices. The primary object of the present invention is to provide simplified receiving circuits and display means which will provide high quality color rendition entirely acceptable to the viewing public, at but a fraction of the cost of the proposed receivers just mentioned. The receiver equipment in accordance with this invention preferably includes a so-called color wheel placed before a cathode ray tube display, but may use more complicated display devices such as tricolor tubes.

It is therefore a primary object of this invention to provide improved methods and apparatus for producing color pictures from color television signals.

It is a further object of this invention to provide conversion apparatus for converting current type monochrome television receiving equipment for production of color pictures from color television signals.

It is a further object of this invention to provide color-wheel type television receiving equipment wherein color signal sampling is based upon the instantaneous position of the color-wheel or similar device.

It is a further object of this invention to provide in a sequential color television system a color sampling sequence of red, green, blue, green.

It is a further object of this invention to provide a motor control circuit useful with color-wheel type television receivers wherein motor speed is controlled by comparison of a sawtooth voltage with a motor-shaft operated switching interval.

Further objects of the invention will be in part expressed and in part obvious as this description proceeds. Detailed description of the features of the invention is given only for purposes of illustration and the scope of the invention is to be determined from the appended claims.

The various features of the invention may be best understood with reference to the accompanying drawings, wherein.

Figures 1, 2, 3, 6:
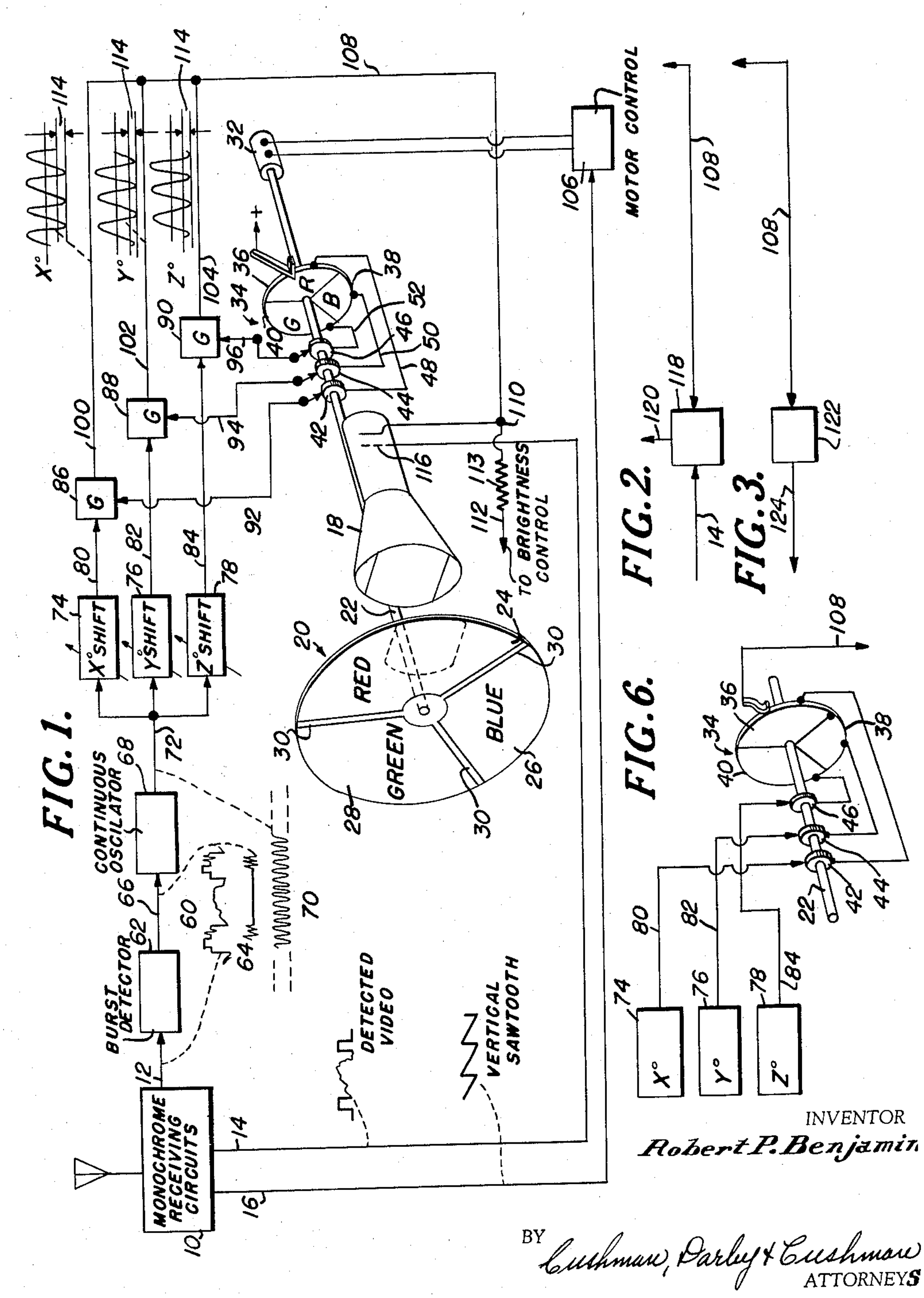
Figure 1 shows a generalized exemplary system according to the present invention.
Figure 2 shows a modification of the system of Figure 1.
Figure 3 shows a further modification of the circuit of Figure 1.
Figure 6 shows a further modification of commutation apparatus according to the invention.

A general understanding of the basic system according to the present invention may be gained with reference to Figure 1.

The system basically provides for the establishment of sampling signals related to the broadcast color standard or reference signal. The signals are employed to switch the video presentation on or off or otherwise alter the display in accordance with the instantaneous "color" position of the sampling signals. When using a color wheel, drum, etc., the system samples the video for signals representing a given color in terms of the instantaneous position of the color wheel. The system is thus to be distinguished from earlier and more complex systems wherein two or more partial "color" signals are derived and the position of the color wheel dictated thereby. As will become fully apparent hereinbelow, wheel synchronization problems are greatly simplified.

Referring now to Figure 1, conventional monochrome television receiver circuits 10 such as now provided for receiving standard monochrome or "black and white" transmissions may be employed, preferably being aligned to respond to the full 4 mc. bandwidth intended for black and white reception. It is further preferable to adjust the circuits to boost the amplitude of the response curve for modulation in the range from 3 to 4 mc. The circuits 10 are tapped by line 12 for making available the composite video, blanking and synchronizing signals, further tapped by line 14 for obtaining the composite video signals and blanking pedestals, and further tapped by line 16 to obtain the vertical sawtooth waveform employed in the vertical sweep.

The usual monochrome display cathode ray tube 18 has positioned in front of it a color-wheel designated generally as 20 fixed for rotation with shaft 22. For exemplary purposes, wheel 20 is illustrated as having red light filter area 24, blue light filter area 26 and green light filter area 28. Spokes 30 intervene between the filter areas, all as may be according to conventional color-wheel design used in earlier color-wheel systems.

Shaft 22 is driven by control motor 32 at a uniform rate of speed. Also mounted on shaft 22 for rotation therewith is a commutator device 34 having conductive segments mounted thereon and electrically separated. For purposes of explanation one sector 36 may be referred to as the red sector, to be in at least electrical alignment with the red filter area 24 of color-wheel 20. Similarly, sector 38 is the blue sector and sector 40 the green sector.

At this point it should be understood that other than three sectors may be incorporated into the color-wheel 20 and the commutator 34. Two can be employed. In some cases it is desirable to have more sections of one color than another. This aspect of the invention will be discussed further hereinbelow. The present wheel and commutator for these sections each is only for purposes of readily understanding the basic principles of the invention.

Also, on shaft 22 are slip rings 42, 44 and 46, these being electrically interconnected with the commutator segments 36, 38 and 40 respectively by conductors mounted for rotation with the shaft, slip rings and commutator. These conductors, designated 48, 50 and 52, are shown diagrammatically in Figure 1.

The purpose of deriving signals on line 12 is to ultimately generate a continuous signal to serve as a reference or standard for determining color signals to be sampled. Signals on line 12 include the hereinabove mentioned phasing burst, designated by reference character 60. Burst detector circuits 62 are provided for detecting the phasing bursts, by eliminating all other signals of like frequency which may appear therebetween during the video and blanking intervals. These bursts of sine wave 64 appear on line 66, which extends from burst detector 62 to a circuit 68 for providing a continuous sine wave. For example, the bursts 64 on line 66 may be employed to stabilize the oscillations of oscillator 68 so the latter remain in a given standard phase relationship with the bursts 60. The continuous oscillations which are designated 70 will appear on line 72 which is the output of oscillator circuit 68.

The continuous phase standard signal 70 is introduced simultaneously to phase shift circuits 74, 76 and 78. For purposes of a general explanation, it may be said that circuit 74 shifts the phase of the signal 70 X°. Circuit 76 shifts the signal Y° and circuit 78 shifts the signal Z°. Representative values for X, Y and Z will be discussed further hereinbelow. It should be understood at this point that while three phase shift circuits are shown, the system may operate in principle with a minimum of one and a maximum of any number of such circuits. At least two different phase positions are required, but one may be the position of reference signal 70, leaving a requirement for but one more. Returning to the example, the outputs of phase shift circuits 74, 76 and 78, appearing on lines 80, 82 and 84, respectively, are introduced to gate circuits 86, 88 90, respectively. The circuits may be of any well known type, for example, circuits employing vacuum tubes having two control grids.

Line 92 is connected as a second input to gate circuit 86, line 94 is connected as a second input to gate circuit 88 and line 96 is connected as a second input to gate 90. Line 92 is connected by means of any suitable brush to slip ring 42, line 94 to slip ring 44 and line 96 to slip ring 46.

Sliding brush 98 is provided in contact with the segments of commutator 34 and is preferably positioned as shown in Figure 1 so as to contact a segment just as the trailing edge of spoke 30 begins to sweep downwardly over the face of display device 18. Thus, when the motor 32 is driven at such speed as to cause a filter area 24, 26 or 28 to remain over the phase of the display device for a time commensurate with the vertical scanning of a sync field, the scansion downwardly of the display device will in general be maintained in synchronism with the movement of the spoke 30.

The contact brush 98 is connected to a suitable source of potential so that when electrical contact is made through brush 98, a commutator segment and a slip ring to one of the gate circuits 86, 88 or 90, the potential will "open" a particular gate. Whenever a particular one of the gate circuits is open, a continuous signal will appear on the output line thereof. Any suitable commutation device may be employed, and no limitation to the described modifications is intended.

The output of gate circuit 86 is on line 100, the output of circuit 88 on line 102 and the output of circuit 90 on line 104. As shown by the waveforms associated with lines 100, 102 and 104, it may be assumed that the signal on line 100 is as shown at X°, the signal on line 102 at Y° and the signal on line 104 at Z°, these in the illustration being separated one from the other by 120 electrical degrees.

The signals on lines 100, 102 and 104 may be referred to as color sampling or color switching signals. It will be noted at this point that only one of these signals will exist at any instant of time, due to the commutation principle which is involved. It will be further understood at this point that the color sampling or switching signal which is on at any given instant of time, is determined by the position of the color-wheel 20 and commutator 34. The position of the wheel and commutator thus dictates the particular sampling signal.

Generally speaking, it is unnecessary to synchronize the rotation of the color-wheel 20 with the scanning operation of the receiver. However, it is preferable to insure that the wheel 20 is sufficiently synchronized with the scansion of the display device 18 so as to place the spokes 30 over the display device to have the spokes 30 move immediately in advance of the vertical scansion. For this purpose a vertical signal such as the vertical sawtooth signal available on line 16 may be applied to motor control circuits 106 for introducing an element of what might be termed spoke synchronization. However, it is to be understood that it is immaterial if the color-wheel should slip in phase a "step." In previous color-wheel systems it is fatal if synchronization slips by one step because then a color mix-up occurs between the color-wheel and the derived color signals being applied to the display device.

Many suitable color-wheel, drum or cone arrangements are known and may be used with the present invention. No limitation to any particular type is intended under the hereinafter appearing claims which recite this element broadly. However, certain preferred embodiments do constitute a part of the present invention and are claimed specifically.

The spokes 30 or other demarkation between color areas can be of many configurations. Generally speaking, it is only important that the flying spot be visible as it is being created on the face of the display device, or as long thereafter as the phosphor continues to emit light. With most cathode ray tubes, this is little more than the duration of a line scan. The continuity of the picture and absence of flicker is due mainly to the persistence of vision in the human eye.

Spoke design is to be determined by the position of the display cathode ray tube face in relation to the wheel. In Figure 1 the tube face is horizontally to one side of the shaft 22. Therefore a straight spoke is the best compromise to approach having a horizontal demarkation across the tube face as the spoke travels from top to bottom. In practice, since television displays are in an aspect ratio of 4 units wide by 3 units high, the smallest wheel diameter for a given tube size occurs when the tube face is on a radius at 45, 135, 225 or 315 degrees with respect to the vertical. In this case the spokes should be curved forwardly of the direction of rotation for the tube face at 135 or 225 degrees, rearwardly for the tube face at 45 or 315 degrees—assuming rotation to move spokes downwardly over the tube face so as to follow the vertical scansion.

Sampling or switching by use of signals on lines 100, 102 and 104 may be carried out in various ways, all according to the present invention. Figure 1 shows a system wherein the just mentioned signals are collected on line 108, which is connected in turn at junction 110 to line 112 in the usual circuit for adjusting the brightness of the display device 18. Line 112 will constitute an existing part of the usual monochrome receiver circuits with a resistor 113 preferably added to provide an adequate input impedance to the brightness circuit. In operation the brightness control (not shown) will be adjusted so as to combine with either the negative or positive excursions of the sampling signals, or portion thereof—designated 114 in Figure 1 at the illustrations of the waveforms on lines 100, 102 and 104—to sufficiently unbias the display device 18 to permit creation of a spot on the face of device 18. Thus the characteristics of the display device may be directly employed in a switching function. Once the sampling waveform has moved into the range 114 the tube will be energized and thereafter the luminance produced on the face of the device 18 will be in accordance with the instantaneous amplitude of the video signal and of the sampling signal. The video signal is applied over line 14 to the control electrode 116 of the display device 18.

As an example of alternative sampling or switching arrangement, a gating principle may be employed as shown in Figure 2. In this figure the sampling or switching signals on line 108 are applied to a gating circuit 118 which utilizes a portion of the amplitude swing of the incoming sampling signals to gate on and off the video signals incoming on line 14, applying the gated video signals to control grid 116 over line 120 which may be connected thereto.

A still more general switching operation is illustrated in Figure 3. Here, the sampling or switching signals on line 108 are applied to whatever electronic switching circuits 122 may be required for impressing a suitable biasing or operating potential on a line 124 for application at any suitable point in the receiver system for suppressing certain portions of the incoming signals. For example, antenna leads can be switched.

Figure 4:
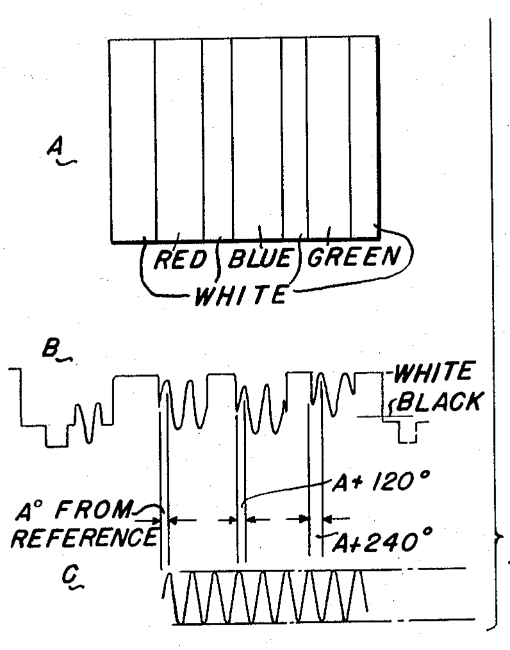
Figure 4 shows waveforms derived from a color bar test pattern exemplary of television signals with which the present invention is useful.
Figure 5:
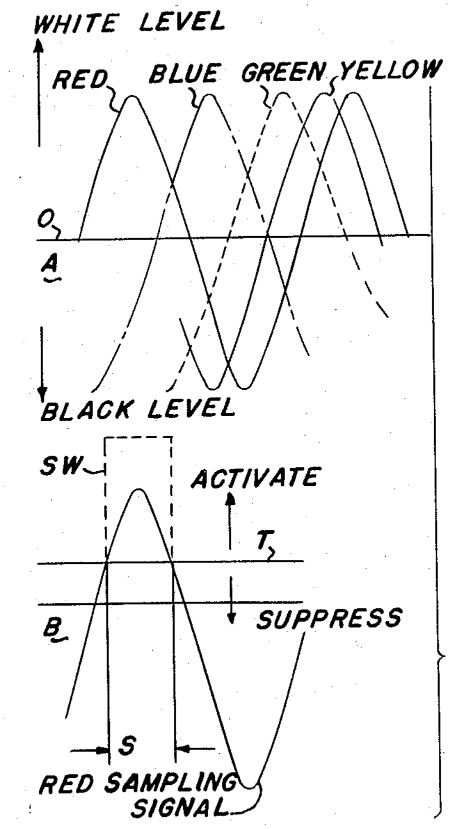
Figure 5 shows waveforms involved in color signal sampling in accordance with the present invention.

The ability to utilize as a sampling means a signal having a given phase position with respect to the reference signal can be further understood by reference to Figures 4 and 5. If it be assumed that the television camera is trained on a colored scene having vertically disposed bars of white, red, white, blue, white, green and white reading from left to right across part *a* of Figure 4, then the detected video signal of each horizontal line will be generally in accordance with part *b* of Figure 4. Part *b* is greatly distorted in the time dimension to show the reference burst on the back portion of the horizontal blanking pedestal, and white levels separated by sine waves during the red, blue and green intervals. These color sine waves will have as a zero base a level related to the luminance component of the video signal and the amplitude of the sine waves represents the color difference brightness. For more exact color rendition the relative amplitude of these sine waves may be increased by the modulation components response curve adjustments above 2.5 mc. mentioned hereinabove. A detailed understanding of these signals may be gained by reference to the standards now set, as hereinabove referred to. The reference burst and each color burst will be at substantially 3.58 mc. according to the presently set standards. Part *c* of Figure 4 shows a continuous sine wave representing a sampling signal having a predetermined phase relationship with the reference burst. Close inspection of parts *a*, *b* and *c*, which are vertically aligned as to time occurrence, shows that the positive peak of the red color signal is indicated as being at an exemplary phase angle of A° from the reference burst. The exemplary sampling signal in part *c* is positioned in alignment, or at 0°, with respect to the red signal in part *b*. The blue signal is 120° removed from the red signal, and the green signal is 120° removed from the blue signal. These angular relationships are for the present standards, wherein the pure or saturated red, blue and green signals are approximately 120° apart. Other phase angles for other standards are within the scope of the invention.

The relationship of the color signals to the sampling signal will depend upon the particular circuits which are utilized, and the delays incident thereto. Experimental simultaneous shift of the circuits 74, 76 and 78 (Fig. 1) will quickly show the most desirable angle, while viewing a known test pattern. A phase angle of approximately −77° between the reference burst and the pure red signal is to be expected.

Whenever the sampling is to be for the red signal, the circuitry, as hereinabove explained, is such that the sampling signal is in a predetermined state of electrical alignment with the position of a pure red signal as set by the television standards. Part *c* of Figure 4 shows the case where for selecting the pure red signal the sampling signal is at 0° with respect thereto. This arrangement permits of operation of the system when the biasing or switching technique employed is such that the display device is in operation and producing a light spot on its face when the sampling signal is related to the red signal (and therefore the reference signal) as stated. It will be fully understood that depending upon the switching technique employed, the desired color signal may only be selected when the sampling signal is at some other phase angle with respect thereto, for example, 180°.

The solid line in part *a* of Figure 5 is intended to represent an expanded portion of a pure red color signal shown in part *b* of Figure 4. The chain line is intended to represent a superimposed blue signal, and the dash line a superimposed green signal. For convenience, each of these signals is shown centered about zero level 0. In accordance with the presently set color standards, signals representing the primary colors, red, blue and green, are approximately 120° apart. This is the condition represented in part *a* of Figure 5. Part *b* of Figure 5 shows the sampling signal in time alignment with the signals in part *a*. The line in part *b* represents the sampling signal set to be at 0° phase angle with the red signal.

With the alignment shown in part *b* of Figure 4, sampling will occur during the interval $S_R$, as determined by the display threshold T. During this interval, in part *a* the red signal is in its swing toward the white level and will therefore provide relatively great illumination as the display spot traverses this interval. However, a blue or a green signal during interval $S_R$ is in its swing toward black, and will provide relatively little illumination. When a red filter area is before the display device, whatever blue or green signals activate the display device do so only in amounts which are ultimately compensated for as the other colors are sampled. It is to be noted from the NTSC standards that a single pure color in a scene may cause the color sine wave to have its means value near the black level, and under some conditions, the "blacker than black" excursions may be clipped. This action is augmented when the response of the receiver circuit is increased for modulation components embracing the color signals. When another color is being sampled, there is thus little opportunity for the spot produced by the existing signal to produce a spurious color. It can be understood with reference to part *b* of Figure 4 that further increase in the amplitude of the 3.58 mc. color signals beyond that shown in part *b*, will drive the "black" excursions thereof further "blacker-than-black," and cause the "whiter-than-white" excursions to be clipped. In such case, a relatively narrow sampling interval will prevent production of any spot on the display for other than the color being sampled. However, extreme precaution of this nature is not necessary for good color rendition.

It will further be understood that in accordance with the presently set televising and transmission standards, when the camera is trained on a scene which has color shades involving the addition of two or three of the primary colors, the color signal will occupy a phase position in predetermined relationship thereto. That is, the color signal does not simply occupy one of three positions, viz., red, blue and green as shown in part *a* of Figure 5, but may be at some intermediate point. For example, yellow is created by a mixture of green and red. Thus, when the camera is trained on a yellow scene, the color signal may be at a phase position shown by the solid line designated by legend "Yellow" in part *a* of Figure 5. In accordance with the present invention, when the green area of the color wheel is before the display device and green is being selected, the sampling signal when aligned with green, will result in some excitation of the tube face phosphor. Similarly when the red area of the color wheel is before tube and the sampling signal is gated "on" there will again be some activation of the tube phosphor in the immediate vicinity of the tube face during the next frame because again there is some level of color signal. Thus, once both red and green have been sampled, the viewer will see yellow.

It will further be apparent that various modifications of the color selection operation will result by moving the threshold line T more positive or more negative. It is thought unnecessary to generally analyze all of the conditions which exist.

Basically, the present invention contemplates for a given color a sampling interval centered about the expected phase position of the color signal for that color to exclusion of others. It can be shown in practice, and from study of the NTSC standards, that colors are faithfully reproduced.

It is emphasized that while the immediately preceding description in connection with Figures 4 and 5 is based on the assumption that the energization of the face of the display device occurs whenever the color signal and the sampling signal are at 0° phase angle, nevertheless use of the various electrodes of the display device and/or gating circuits may be such as to cause the display device to move beyond its threshold level when the sampling signal is, in fact, undergoing some other movement, for example, approaching a phase angle 180° from the color signal. Therefore, no particular limitation is intended.

As has been hereinabove stated, the frequency of the phase reference signal 70 shown in Figure 1, is set at substantially 3.58 mc. per second (actually 3.579545 mc. per second). Thus the spacing from peak to peak of the sampling signal as shown in Figures 4 and 5 is equal to $$\frac{1}{3.58}$$

micro seconds. As a further aspect of the present color standards the line or horizontal scanning frequency is substantially 15,734 cycles per second, resulting in $$\frac{1}{15{,}734}$$

seconds as the approximate duration of a line scan. Dividing $$\frac{1}{15{,}734}$$

by $$\frac{1}{3.58\times 106}$$

shows that approximately 221 of the sampling intervals occur during a line scan. The duration of sampling about each sampling peak or center will be determined by the selection of the operating threshold (line T in Figure 5, part *b*). It may be desired to set this well enough removed from the peak level to permit increased response from the color signal even when the latter is centered on a primary color different than the one corresponding to the area of the color wheel in fron of the display device at any given instant.

Figure 6 shows a system similar to that of Figure 1, but wherein the gates 86, 88 and 90 are dispensed with and the commutator device 34 itself utilized to transmit the outputs of the phase shift circuits 74, 76 and 78 to the line 108. It is to be emphasized that any suitable commutator device may be utilized. For example, capacitive coupling type commutators may be employed.

It may be desirable to adjust the brilliance of the respective color signals in different amounts to achieve particular results. Such modification of signal strength may be carried out in a system such as that of Figure 1, by having the switching function in the display device 18 (Fig. 1), the gating circuit 118 (Fig. 2) or the switching circuit 122 (Fig. 3) also responsive to amplitude of the respective sampling signals on lines 100, 102 and 104. The amplitudes of these signals may be selectively attenuated by any convenient means (not shown).

Referring to part *b* of Figure 5, the degree of activation of the display device during the sampling interval may be in instantaneous proportion to the sine wave shown above line T, or a square wave (shown as the dash line designated SW) may be gated on (as by circuit 118 in Figure 2) to place the display device in fully activated condition during the entire sampling interval. Any other suitable pulse form also may be employed.

Figure 7:
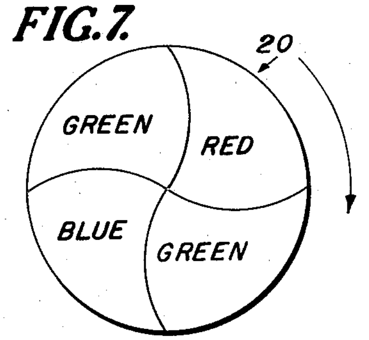
Figure 7 shows a preferred color sampling sequence arrangement in accordance with the invention.

Figure 7 shows a particular color wheel in accordance with my invention, although no limitation thereto in claims not covering it specifically is intended. Wheel 20′ is divided into four segments of sequence red, green, blue, green. Successive sampling in this order has been discovered to produce unusually excellent results. While color switching can be at greater or less intervals, switching at field repetition rate is preferable. Preferably, since two greens appear, each green filter should be reduced in transparency by one-half in comparison to the transparency of the red and blue filters.

As a further example of operation, the three basic colors red, green and blue may be replaced at the color wheel by filters of orange and cyan, these being utilized in conjunction with color signals on lines 100 and 102 (a third signal being unnecessary) separated by 180 electrical degrees.

From the above it will be apparent that the phase shift circuits 74, 76 and 84 are preferably adjustable in some convenient manner so as to permit the operator to variously set the phase shifts for preferred sampling.

To further explain the general case, it is to be understood that in accordance with the invention the color component of the received signals may be sampled independently of the luminance or black and white components. In fact, sampling of the color component independently of the luminance component results in certain advantages. In regard to this aspect of the invention, the luminance portion of the signals, which are the modulation components below about 2.5 mc. in the NTSC signals, may be directly applied to one element of a signal mixing device, for example, the control grid of the display cathode ray tube. The color component, existing between approximately 2.5 and 4.5 mc. may be sampled in keeping with the foregoing sampling techniques, or by use of so-called synchronous demodulating circuits having as a reference input sequentially presented color sampling signals in accordance with this invention. By this process a voltage representing color brightness or "color difference" is obtained which thereafter may be mixed with the luminance signals in any convenient circuit. For example, the color signals may be mixed with the luminance signals by being applied to the cathode of the cathode ray tube display where the luminance signals are applied to the control grid thereof. Other mixing circuits will be apparent to those skilled in the art.

Figure 8:
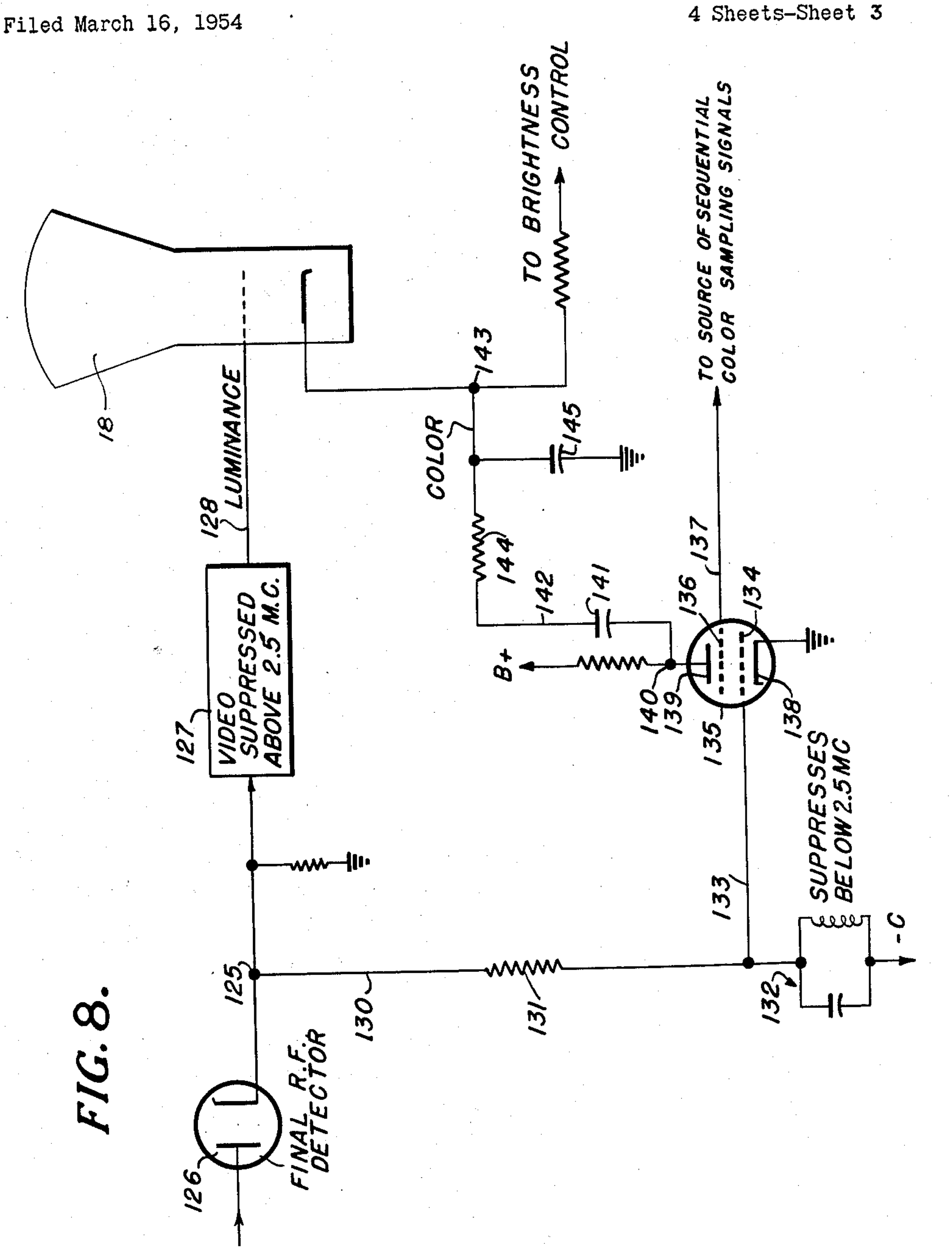
Figure 8 shows a modification of the invention wherein color signals are separated from luminance signals for sampling.

As an example of the arrangement described in the preceding paragraph, Figure 8 shows a circuit where composite video signals, that is, signals comprising luminance as well as color components, are available at junction 125 following a detector diode 126. These signals are applied to video amplifier circuit 127 which may be so arranged to pass only modulation components up to about 2.5 mc. All other modulation components above this value will be suppressed, as by effective short-circuiting across a convenient capacitor. The resulting so-called luminance signals appear on line 128 for application to a mixing device. In Figure 8 line 128 is shown connected to the control grid of the cathode ray tube display 18 of Figure 1. The composite signals at junction 125 are also coupled over line 130 and resistor 131 to a tuned circuit 132 which will suppress all modulation component frequencies below about 2.5 mc. Thus, the color signal exists on line 133 which is connected to the control grid 134 of a vacuum tube 135 employed in a synchronous demodulating circuit. A type 6AU6 tube may be conveniently employed. Suitable reference bias for grid 134 may be obtained by connecting the opposite end of resonant circuit 132 to a suitable source of biasing potential. The screen grid 136 of tube 135 is arranged to be supplied with sampling signals over line 137. Line 137 may be connected as to line 108 in Figure 1 so that sampling signals having various predetermined phase relationships with the color reference signal are applied to screen grid 136. The cathode 138 of tube 135 may be connected to ground, and the anode 139 connected to a source of B potential, as is conventional. Tube 135 is to be operated in non-linear fashion. Junction 140 in the plate circuit of tube 135 may be coupled through large capacitor 141 to a convenient circuit for mixing the color difference signals available at junction 140 with the luminance signals on line 128. For example, the color difference signals coupled through capacitor 141 may be applied over line 142 to the cathode of the display device 18. The cathode may be connected at junction 143 into the brightness control circuit of the receiver, as suggested in Figure 1 at junction 110. An integration circuit, whether specifically provided or inherent in the circuitry beyond capacitor 141, is represented in Figure 8 by the resistor 144 and capacitor 145.

If it be assumed that the tube 135 is operated in a non-linear manner, a color signal applied to the grid 134 of tube 135 at 0° phase angle with the sampling signal will result in an output voltage having a given integration level at junction 143. If a color signal (assuming it to be of the same amplitude as before) should be 180° from the sampling signal (to assume an exemplary phase difference), the integration level will be altered. It is thus apparent that by applying to the screen grid 136 successive sampling signals having different phase positions with respect to the color signal according to predetermined colors to be selected, the luminance or black and white signal may be mixed with the color difference signal to provide a correct level of excitation of the display device. It will be understood that the phase angles must be correlated to the circuitry to increase the display brightness for color signals of increasing amplitude and vice-versa.

The arrangement described with reference to Figure 8 in the preceding paragraphs has several advantages, one of which is that for whatever white or gray level may be in the video signals, the display device is continuously illuminated at that level.

A more specific description will now be given of an illustrative system, under the basic principles outlined hereinabove, but without limitation. The system now to be described will be based on use of six color areas of the color wheel and correspondingly six commutator segments. This system will also utilize the display device 18 as a switching or sampling medium. However, the application of arrangements of Figures 2, 3 and 6 and all others within the scope of this invention will be immediately apparent.

Figure 9:
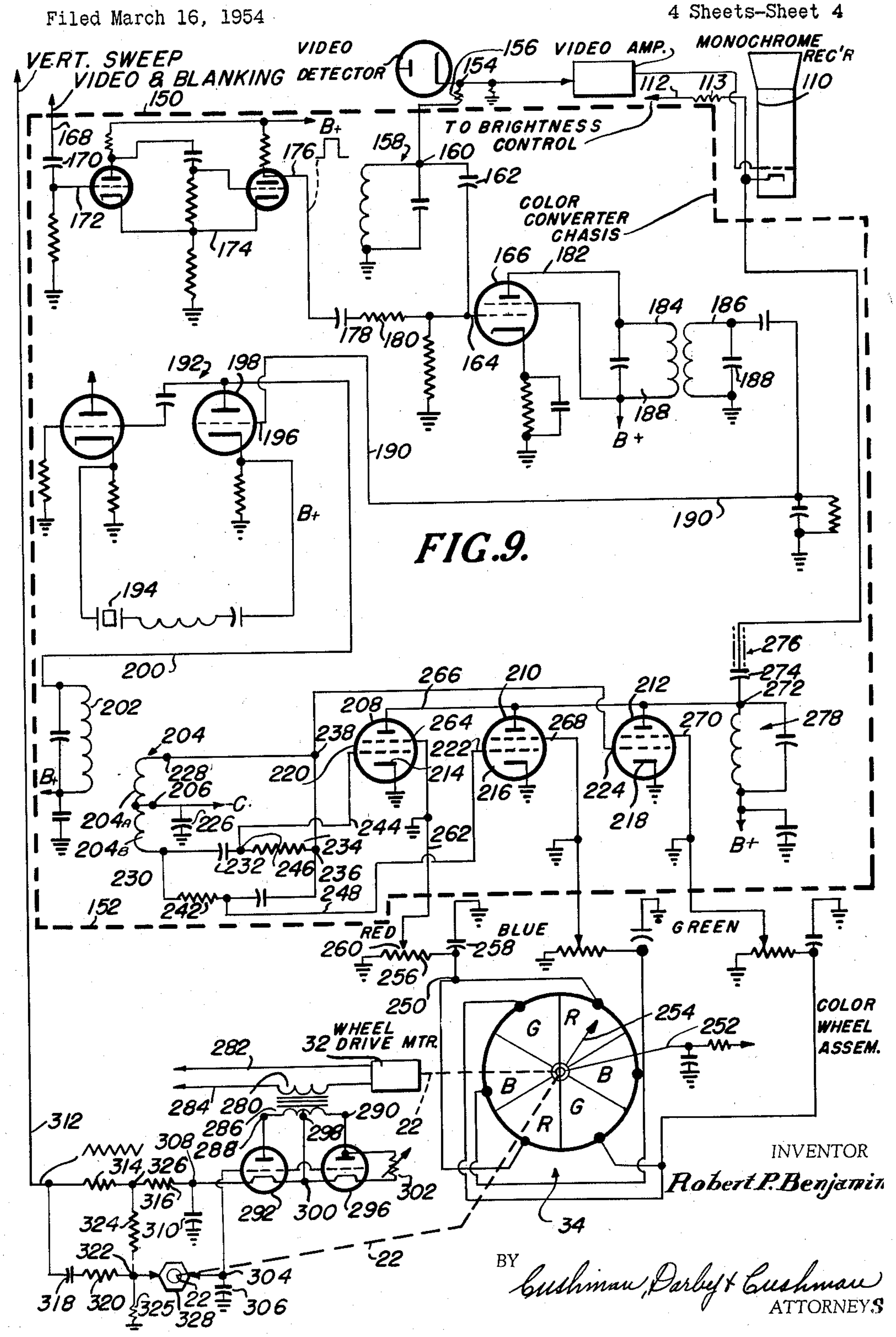
Figure 9 shows a specific television receiver conversion in accordance with the invention.

Having in mind the general explanation given hereinabove and now referring to Figure 9, the system is subdivided by dash lines 150 and 152 to show a demarkation between the components above line 150 normally found in conventional monochrome or black and white receivers, the components between lines 100 and 102 for conveniently providing adapter circuits for converting existing equipment, and below line 152 for the color wheel control and commutator circuits.

Video signals at junction 154 will correspond to those on line 12 in Figure 1. These may be coupled through resistor 156 to resonant circuit 158 for suppressing all but the color burst reference frequency which is substantially 3.58 mc. All 3.58 mc. components of the composite video blanking synchronizing and color reference signals will be available at junction 160. These signals are coupled through capacitor 162 to control grid 164 of a burst amplifier tube 166.

Only the 3.58 mc. signals derived from the reference burst are desired. To suppress other 3.58 mc. signals, positive horizontal or line pulses are made available on line 168 and coupled through resistor 170 to the input grid 172 of a gating multivibrator circuit of conventional "one-shot" type, designated generally as 174. The circuit is adjusted to produce a positive going pulse of approximately 10 microseconds duration, having a leading edge just following the horizontal or line synchronizing signal and a trailing edge just following the horizontal or line synchronizing signal and a trailing edge just following the phase reference burst 60 (Fig. 1). Thus, it may be said that the 10 microsecond positive pulse embraces the burst 60, but not any other 3.58 mc. signals which may exist with the video or blanking signals. The 10 microsecond pulse appears on output line 176 of multivibrator circuit 174 and this is coupled through capacitor 178 and resistor 180 to the previously mentioned control grid 164 of burst amplifier tube 166. Tube 166 is to be so operated that it will amplify 3.58 mc. signals only during the existence of the positive pulses appearing on line 176. The anode line 182 of tube 166 is connected to a winding 184 inductively coupled to a winding 186. Both windings 184 and 186 have associated therewith capacitors 188 for further tuning the circuit to 3.58 mc. The 3.58 bursts derived from the reference burst 60 (Fig. 1) are coupled over line 190 to an oscillator circuit designated generally as 192. Oscillator circuit 192 is controlled by crystal 194 selected to vibrate at 3.58 mc. The bursts of reference signal on line 190 are applied to control grid 196 of tube 198, this tube serving to synchronize the oscillator during the existence of the bursts of signal on line 190 so as to maintain the output of oscillator on line 200 constant and in a given phase relationship with the reference bursts. It will be understood that a continuous signal (signal 70 in Figure 1) is available on line 200. The continuous signal on line 200 is inductively coupled from winding 202 to winding 204. Winding 204 is mid-tapped at junction 206, leaving sections 204a and 204b.

The phase of the voltage across winding 240 with respect to the received bursts 60 may be adjusted by manipulation of the just described circuits wherever convenient.

Gating circuits analogous to gate circuits 86, 88 and 90 of Figure 1, are associated with vacuum tubes 208, 210 and 212 respectively. The cathodes 214, 216 and 218 of these tubes are connected to ground. The first control grids 220, 222 and 224 respectively are ultimately coupled to the winding 204. Thus, signals between the first control grids and cathodes are related to the ground connection. Section 204a of coil 204 is connected to ground through capacitor 226 for developing signals of 120° phase difference at grids 220, 222 and 224. Section 204a of winding 204 may conveniently be arranged to develop a potential between junction 206 and junction 228 which is at a given phase angle with the voltage across winding 202. Thus, the voltage on grid 224 will be at this phase angle with respect to voltage across winding 202.

The voltage across section 204b of winding 204 looking from the mid-tap toward junction 230 will be 180° out of phase from the voltage across section 204a looking from the mid-tap to junction 228. Thus the just mentioned voltage appears between the junctions 206 and 230. A capacitor 232 and resistor 234 are connected in series between junction 230 and a junction 236. Junction 236 is connected to junction 238 which, in turn, is connected to junction 228, thus completing a series circuit having both sections of winding 204, capacitor 232 and resistor 234 in series. Another capacitor 240 and resistor 242 are connected in series between junctions 230 and 236. Grid 220 is connected over line 244 to junction 246 between capacitor 232 and resistor 234. The value of the resistor and capacitor may be such as to create a phase shift of 60° leading the voltage across section 204b of winding 204. The capacitor 240 and resistor 242 are connected in opposite order to capacitor 232 and resistor 234 and junction 247 is connected by line 248 to grid 222 of gate tube 210. With corresponding values for capacitor 240 and resistor 242 respectively, grid 222 will carry a voltage lagging by 60° the voltage across section 204b of winding 204. It will now be understood that each of the grids 220, 222 and 224 is operated 120 electrical degrees apart.

The red sectors of commutator device 34 are electrically collected at junction 250 and the positive potential from line 252 fed thereinto through the commutator wiper device 254 is distributed across resistor 256 to ground. A capacitor 258 may be provided to ground for smoothing any ripple. From adjustable tap 260 a part of the potential on line 252 is applied over line 262 to the second control grid 264 of red gate tube 208. The output of this tube is on line 266. Similarly, the blue sectors of the commutator are connected to the second control grid 268 of tube 210, and the green commutator segments are connected to the second control grid 270 of gate tube 212. The outputs of tubes 210 and 212 are also connected to line 266. Therefore, all are electrically connected to a junction point 272.

It will now be apparent that an amplified color switching or sampling frequency as gated through one of the tubes 208, 210 or 212 is available on any instant of time at junction 272. The particular signal is determined by the instantaneous position of the commutator device 34. The signals at junction point 272 are coupled through capacitor 274 over shielded line 276 to the brightness control line junction 110 (Fig. 1) leading to the display device 18. The control electrode 116 of the display device is connected to the video amplification circuits as described in Figure 1. A circuit 278 tuned to 3.58 mc. is provided between junction 272 and source of B+ to assist in transmittal of the signals through the shielded cable 276, to the display device.

It is to be emphasized that no limitation is intended insofar as selection or sampling of color signals by the sampling signal is concerned. That is, while in Figures 1–3 and 9 the composite video (luminance plus color) signal is coupled to the control electrode, in general the luminance signal may be separated from the color signal and introduced in any manner to ultimately determine the instantaneous brightness of the presentation as described in connection with Figure 8. The present invention basically only requires that the chromance signal be available at some point for comparison with the sampling signal to determine color hue.

The color wheel and commutator drive motor 32 (Figs. 1 and 9) is maintained in "spoke" synchronism by providing a transformer winding 280 in one of the power leads 282 and 284 connected to the motor. The other transformer is winding 286 which has outer end junctions 288 and 290 thereof connected to the anodes of vacuum tubes 292 and 296 respectively. The mid-tap of winding 286 is at junction 298 which is connected to junction 300 between the cathodes of tubes 292 and 296. An adjustable resistor 302 is provided between the cathode and anode of tube 296 to provide a wheel position adjustment. The control grids of tubes 292 and 296 are connected in common to junction 304 which is coupled through storage capacitor 306 to ground. The cathodes of tubes 292 and 296 are further connected in common to junction 308 which is coupled through smoothing capacitor 310 to ground.

The negative going vertical sawtooth wave utilized in the vertical scan of the display device 18 is introduced on line 312 and is coupled through resistors 314 and 316 to junction 308. The sawtooth wave on line 312 is also coupled through capacitor 318 and resistor 320 to junction 322, the latter junction being connected through resistor 324 to a junction 326 between resistors 314 and 316. Junction 322 connects to ground through resistor 325.

An electrical make and break interrupter 328 mounted on shaft 22 (Fig. 1) is provided between junctions 304 and 322. Thus, the electrical make and break between junctions 304 and 322 will have a definite relationship to the color wheel spoke position. The purpose of this circuit is to maintain a relationship between spoke position and the sawtooth waveform on line 312. In this way the spoke position is correlated to the vertical sweep in the display device.

A negative going sawtooth wave as indicated above line 312 is derived from the receiver circuits and is coupled as shown to junction 322, presenting a voltage drop across resistor 325 to ground. Whenever contact is made at interrupter 328, which preferably is only for a period short in comparison to the sawtooth cycle, the storage condenser 306 will receive a charge. Best results may be obtained by having a contact closure for each spoke of the color wheel.

Resistor 316 and condenser 310 serve to smooth the sawtooth wave to provide a bias for the cathodes of tubes 292 and 296. Anode-cathode potential is supplied to these tubes by voltages developed in winding 286.

When the color wheel is turning so that the spokes are in the desired position with respect to time the interval of closure of the interrupter 328 is such that the retrace time is bracketed. This serves to create a given average value of change on condenser 306, which may be taken as a zero reference. Tubes 292 and 296 will be in a given state of conduction accordingly.

If the wheel speeds up, the contact closure will occur during a portion of the negative excursion of the sawtooth wave, rather than during retrace time. Therefore, a burst of negative potential will be applied to condenser 306, and the grids will move negative. This decreases conduction through the vacuum tube, causing a greater impedance to exist in the motor circuit. Accordingly, the motor slows down.

If the wheel slows down from its normal speed, a burst of positive potential is applied to condenser 306, causing increased conduction in the tubes, and therefore decreased impedance in the motor circuit, causing the latter to speed up.

The motor 32 may be any of a variety of types wherein the torque is a function of the input current.

Resistor 302 between the cathode and plate of tube 296 is adjustable to establish a reference level of impedance in the motor circuit so as to provide a point about which the self-governing action will operate. Spoke position relative to the face of the display device can be adjusted by proper setting of interrupter 328 on shaft 22.

Figure 10:
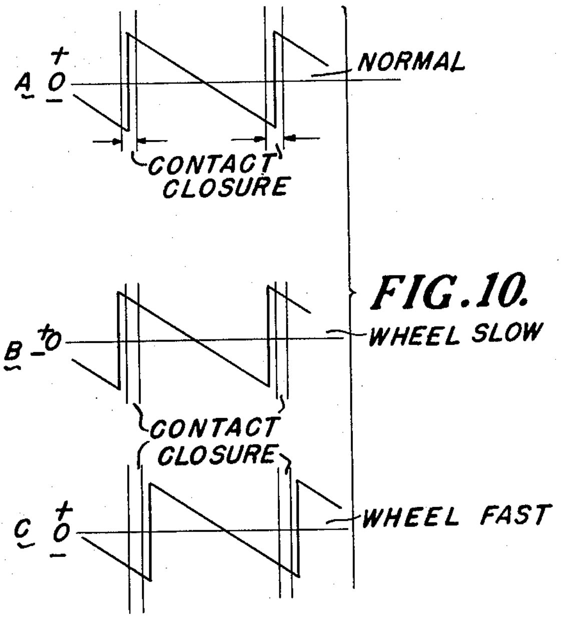
Figure 10 shows waveforms resulting from use of a motor control circuit in accordance with the invention.

Figure 10 parts *a*, *b* and *c* show the relationship of contact closure to the sawtooth wave during normal, slow and fast operations, respectively.

It will now be understood that the just described motor control circuit is basically a means for utilizing a sawtooth wave to apply a pronounced corrective factor whenever a motor shaft operated switching interval occurs outside the sawtooth retrace interval.

Preferred embodiments of the present invention utilize a color wheel type display because of the low cost of this embodiment. However, the color sampling feature of the invention may be carried out by otherwise cyclically shifting a simpling signal among the color sampling positions, and sequentially directing the detected color signal to display devices of the tri-color type. As an example, commutation can be by known electronic circuits.

Insofar as the speed of operation of a color wheel is concerned, the hereinabove described embodiments show sequential sampling at field repetition rate. This rate under the presently set standards is approximately 60 times per second, or 3600 times per minute. A three sector wheel will run at 1200 r.p.m. Where six sectors are employed as in the embodiment of Figure 8, the rotational speed will be 600 r.p.m. Where the wheel carries four sectors as in the embodiment of Figure 7, for field sequential presentation the rate will be 900 r.p.m.

It is entirely within the scope of the present invention to set the sequential sampling rate at less than field repetition rate. In an extreme case, with an accurately positioned wheel spoke, it is possible to change the color sampling during a line trace. The basic requirement is that the display spot be visible through a filter area the color of which corresponds to the color being sampled. It is apparent that the sampling can be changed without difficulty during a line retrace time to provide sequential sampling at line frequency, so long as the line of color demarkation is carefully related to the instantaneous spot position. As previously stated, the persistence of the spot on the tube is usually very short, and no serious overlapping should occur.

Figure 11:
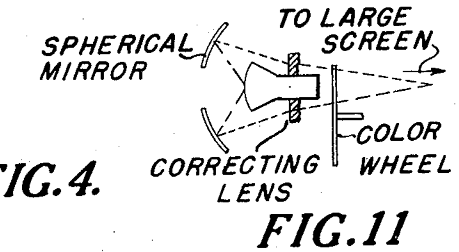
Figure 11 shows the invention applied to a projection television receiver.

The invention is entirely applicable to use of projection type television receivers wherein the optical path between the receiver display tube and the image observed by the viewer's eyes includes certain optical devices such as spherical mirrors, etc. In this type of receiver, the display device usually includes a cathode ray tube having a very small face, say three or five inches in diameter. A system of this type is diagrammed in Figure 11. Accordingly, a color wheel of small diameter may be employed at some point in the optical path, and this may be operated at extremely high angular velocities without resulting in objectionably high peripheral speeds. Therefore, in this embodiment sequential sampling at the line repetition rate is possible.

It will be understood that reflective optical arrangements are also useful for the present invention. For example, color switching may employ a rotating polygon also used in line or field trace in projection television.

For synchronizing the color wheel to the television signals at high speeds such as line sequential rates, an interrupter such as 328 in Figure 8, may have sufficient number of contact points to provide a correction signal for every line retrace time. However, satisfactory results can be obtained by providing a corrective sampling at a lesser repetition rate.

The foregoing descriptions of embodiments of the invention are given only for purposes of illustration and the scope of the invention is to be determined by the appended claims.

What is claimed is:

1. Means for converting a monochrome image to a color image including, a monochrome image reproducer, a color image converter including a predetermined number of component color filter segments and disposed to rotate in a prescribed position relative to said monochrome image reproducer, said monochrome image reproducer adapted to receive color signals and monochrome signals, a synchronous detector, a local signal source, a phase shift device coupled between said local signal source and said synchronous detector, means for mechanically coupling said phase shift device to said color disc to cause locally generated signals of predetermined phase corresponding to prescribed orientation of said color image converter to be applied to said synchronous detector, means for coupling said signals produced by said synchronous detector and said monochrome signal to said monochrome image reproducer whereby said monochrome image reproducer reproduces image information relative to the orientation of said color image converter.

2. In color television receiving apparatus for producing a color picture from received signals which comprise a color component, a luminance component and a color reference component, wherein color hue is represented by the instantaneous phase angle between said color component and color reference component; a picture display device, means for separating the luminance and color components as detected, means for generating a color sampling signal sequentially shiftable among a plurality of phase angle values with respect to the color reference component, means for sequentially shifting the sampling signal among said phase positions, means for generating a signal of a value related to the instantaneous phase relationship between the color component and the sampling signal in one of said phase positions, and means for combining said luminance component and said signal related to the instantaneous phase relationship between the color component and the sampling signal for actuation of the picture display device.

3. Apparatus for converting a monochrome television receiver for production of color pictures during reception of television signals having at least a color component and a color hue reference component, said apparatus comprising; means for generating a signal synchronized with the color hue reference component, color sampling signal generating means responsive to said synchronized signal for producing at least two discrete sampling signals, sampling means including means for sequentially positioning color filter means of different coloring properties in the line of sight between a viewer's eyes and the display device of said receiver, and means for sequentially applying said discrete sampling signals to said receiver to control the response of the display device of the receiver to said color component in synchronism with said sequential positioning of said color elements in said line of sight.

4. In color television receiving apparatus for producing a color picture from received simultaneous type color television signals which comprise an amplitude modulation frequency component for representing a color hue, which comprise a color hue reference component for providing a phase reference signal, wherein the signals are transmitted so that the instantaneous phase angle between the color component and the reference component is variable and at any instant denotes a particular primary color or blend of colors, and wherein the phase angle range of the color component in relation to the reference component includes at least two phase angle values representing at least two predetermined primary color hues; the said apparatus comprising picture display means including means for providing a viewable light spot in said pretermined primary color hues one at a time, means for sequentially shifting the display means from possible production of one of said primary colors to another, means for generating at least two color sampling signals each phase related to said color hue reference component so as to be related to said phase angle values representing said pretermined primary color hues of said received signals, means interconnecting the display shifting means and the sampling signal generating means for maintaining same in color synchronism, means for driving the color shifting means to cycle through the said primary colors at a rate different from the frequency of the color component, detecting means including means for detecting said color hue component frequency, and means connected with said sampling signal generating means and said detecting means and responsive to interaction between the prevailing sampling signal and the color component frequency for energizing the display device in accordance with the degree of instantaneous phase angle correspondence of the color hue component of the received signal with the currently applied sampling signal to cause a spot to show to a predetermined extent related to the correspondence of the phase position of the detected color component with the applied sampling signal.

5. Apparatus as in claim 4 for receiving signals which also comprise a luminance component, the detecting means including means to detect the luminance component, and the display energizing means including means responsive to the combined luminance and color components and sampling signal to control the instantaneous brightness of said spot.

6. Apparatus as in claim 4 for receiving signals which also comprise a luminance component, the detecting means including means to detect the luminance component, the detecting means also including means for separating the luminance component from the color component, the display energizing means including means responsive to the color component and a sampling signal to the exclusion of the luminance component to generate a display chromance control signal, and means for combining the luminance component and the chromance control signal for activating the display means.

7. Apparatus as in claim 6 wherein the sampling means includes a synchronous demodulating circuit having first and second inputs and an output, the circuit being arranged to have the color hue component detecting means connected to the first input to have the sampling signal generating means connected to the second input, the arrangement being such that the sampled color signal appears at said output.

8. Apparatus as in claim 4 for receiving signals in which the amplitude of the detected color hue component convey color brightness information, and wherein said display energizing means includes means to activate said display means to show an instantaneous intensity proportional to the instantaneous amplitude of said detected color brightness component.

9. Apparatus as in claim 4 wherein the picture display means includes a cathode ray tube having at least two beam intensity control electrodes, and wherein the display energizing means includes means for applying a signal related to said color hue component and said sampling signal are applied each to one of said electrodes for providing said energization of the display device.

10. Apparatus as in claim 9 wherein the said signal related to the color hue component is amplitude modulated to convey color brightness information, and wherein said energization means includes means for operating said electrodes so as to also activate said display means in instantaneous intensity proportional to the instantaneous amplitude of said color brightness signal.

11. Apparatus as in claim 4 wherein said display energizing means includes switching means responsive to said sampling signals and connected with the apparatus to at least partially suppress the operation thereof during predetermined time intervals.

12. Apparatus as in claim 11 wherein the received signals comprise a color brightness component which is detected as an amplitude modulation to provide color brightness information, and wherein said energization means is arranged to activate said display means in instantaneous intensity proportional to the instantaneous amplitude of said detected color brightness component.

13. Apparatus as in claim 4 wherein said display energizing means includes switching means responsive to said sampling signals and connected with the display means to at least partially suppress the operation thereof during predetermined time intervals.

14. Apparatus as in claim 13 wherein the received signals comprise a color brightness component which is detected as an amplitude modulation to convey color brightness information, and wherein said energization means is arranged to activate said display means in instantaneous intensity proportional to the instantaneous amplitude of said detected color brightness component.

15. Apparatus as in claim 4 wherein the driving means cycles the color changing means at the field repetition rate of the received signals.

16. Apparatus as in claim 4 wherein the display color changing means includes means for sequentially positioning color filter means of discrete ones of said primary color hues in the line of sight between a viewer's eyes and the source of said light spot in the display means.

17. Apparatus as in claim 16 wherein optical enlarging means is positioned in said line of sight, and the color filter means is positioned therein at a point prior to final enlargement.

18. Apparatus as in claim 16 wherein the color synchronization means includes means responsive to the instantaneous position of the color filter means for controlling the output of the sampling signal generating means.

19. Apparatus as in claim 18 wherein the synchronization means includes a shaft, the color filter means is a wheel fixed on said shaft, and the sampling signal generating means includes a commutation device also fixed on said shaft.

20. Apparatus as in claim 18 wherein the display color changing means includes motor means for continuously moving the color filter means with respect to the picture forming means, interrupter means movable with the filter means, sawtooth voltage generating means for controlling scansion in the display means, and means including the interrupter means for sampling said sawtooth voltage for synchronizing the movement of lines of demarkation between colors on the filter means with the scansion in the display means.

References Cited in the file of this patent

UNITED STATES PATENTS

| | | |
|---|---|---|
| 2,509,730 | Dome | May 30, 1950 |
| 2,648,722 | Bradley | Aug. 11, 1953 |
| 2,674,650 | Houghton | Apr. 6, 1954 |
| 2,703,340 | Hoyt | Mar. 1, 1955 |
| 2,715,153 | Sziklai | Aug. 9, 1955 |
| 2,738,377 | Weighton | Mar. 13, 1956 |
| 2,773,929 | Loughlin | Dec. 11, 1956 |